US008705389B2

(12) United States Patent
Koo et al.

(10) Patent No.: US 8,705,389 B2
(45) Date of Patent: *Apr. 22, 2014

(54) QUALITY CONTROL SCHEME FOR MULTIPLE-INPUT MULTIPLE-OUTPUT (MIMO) ORTHOGONAL FREQUENCY DIVISION MULTIPLEXING (OFDM) SYSTEMS

(75) Inventors: Chang-Soo Koo, Melville, NY (US); Robert Lind Olesen, Huntington, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/983,491

(22) Filed: Jan. 3, 2011

(65) Prior Publication Data
US 2011/0096857 A1 Apr. 28, 2011

Related U.S. Application Data

(63) Continuation of application No. 11/118,867, filed on Apr. 29, 2005, now Pat. No. 7,864,659.

(60) Provisional application No. 60/598,183, filed on Aug. 2, 2004.

(51) Int. Cl.
*H04J 1/16* (2006.01)
*H04L 1/00* (2006.01)

(52) U.S. Cl.
CPC .................. *H04L 1/0026* (2013.01)
USPC ............... 370/252; 370/203; 375/260

(58) Field of Classification Search
USPC ............ 370/203–210, 229–235, 241–252, 370/310–350; 375/260–265
See application file for complete search history.

(56) References Cited

U.S. PATENT DOCUMENTS 6,173,162 B1 1/2001 Dahlman et al.
7,120,199 B2 10/2006 Thielecke et al.
(Continued)

FOREIGN PATENT DOCUMENTS

EP 1 341 318 9/2003
WO 03/001702 1/2003
(Continued)

OTHER PUBLICATIONS

IEEE P802.16-REVd/D5-2004, "Part 16: Air Interference for Fixed Broadband Wireless Access Systems", May 2005.
(Continued)

*Primary Examiner* — Kan Yuen
(74) *Attorney, Agent, or Firm* — Volpe and Koenig, P.C.

(57) ABSTRACT

A method and apparatus for optimizing the system capacity of an Orthogonal Frequency Division Multiplexing (OFDM) system that uses with Multiple-Input Multiple-Output (MIMO) antennas. In a receiver, a target quality of service (QoS) metric and reference data rate are set. The target QoS metric may be set to a predetermined value and/or may be adjusted dynamically with respect to packet error rate (PER) by a slow outer-loop control processor. The QoS of received signals are compared to the target QoS. Depending on the comparison, the receiver generates a channel quality indicator (CQI) which is sent to the transmitter. The CQI is a one or two bit indicator which indicates to the transmitter to disable, adjust or maintain data transmission rates of particular subcarriers, groups of sub-carriers per transmit antenna, or groups of sub-carriers across all transmit antennas. At the transmitter, the transmitted data rate is disabled, adjusted or maintained.

10 Claims, 5 Drawing Sheets

(56) References Cited

U.S. PATENT DOCUMENTS

| | | |
|---|---|---|
| 7,181,170 B2 | 2/2007 | Love et al. |
| 2002/0122383 A1* | 9/2002 | Wu et al. .................. 370/210 |
| 2002/0136162 A1 | 9/2002 | Yoshimura et al. |
| 2002/0193118 A1 | 12/2002 | Jain et al. |
| 2003/0012160 A1 | 1/2003 | Webster et al. |
| 2003/0039217 A1 | 2/2003 | Seo et al. |
| 2003/0072395 A1 | 4/2003 | Jia et al. |
| 2003/0074674 A1 | 4/2003 | Magliaro |
| 2003/0086371 A1 | 5/2003 | Walton et al. |
| 2003/0125040 A1 | 7/2003 | Walton et al. |
| 2003/0232622 A1 | 12/2003 | Seo et al. |
| 2004/0001429 A1 | 1/2004 | Ma et al. |
| 2004/0110473 A1 | 6/2004 | Rudolf et al. |
| 2004/0141466 A1 | 7/2004 | Kim et al. |
| 2004/0151133 A1 | 8/2004 | Yi et al. |
| 2004/0215809 A1 | 10/2004 | Kim et al. |
| 2004/0218519 A1 | 11/2004 | Chiou et al. |
| 2005/0041622 A1 | 2/2005 | Dubuc et al. |
| 2005/0111406 A1 | 5/2005 | Pasanen et al. |
| 2005/0111407 A1 | 5/2005 | Hosein et al. |
| 2005/0141624 A1 | 6/2005 | Lakshmipathi et al. |
| 2005/0152466 A1* | 7/2005 | Maltsev et al. ............... 375/260 |
| 2005/0185733 A1 | 8/2005 | Tolli et al. |
| 2005/0282500 A1 | 12/2005 | Wang et al. |
| 2006/0040696 A1 | 2/2006 | Lin |
| 2006/0073789 A1 | 4/2006 | Horisaki |
| 2006/0126493 A1* | 6/2006 | Hashem et al. ............... 370/208 |
| 2007/0206623 A1 | 9/2007 | Tiedeman et al. |
| 2008/0039107 A1 | 2/2008 | Ma et al. |

FOREIGN PATENT DOCUMENTS

| | | |
|---|---|---|
| WO | 03/071730 | 8/2003 |
| WO | 03/085876 | 10/2003 |
| WO | 2004/038984 | 5/2004 |

OTHER PUBLICATIONS

Mahadevappa et al., "Rate Feedback Schemes for MIMO-OFDM 802.11n," IEEE 802.11-04/0372r0 (Mar. 2004).

Yih et al., "Adaptive Modulation, Power Allocation and Control for OFDM Wireless Networks," IEEE International Symposium on Personal, Indoor and Mobile Radio Communications, vol. 2, pp. 809-813 (Sep. 18, 2000).

* cited by examiner

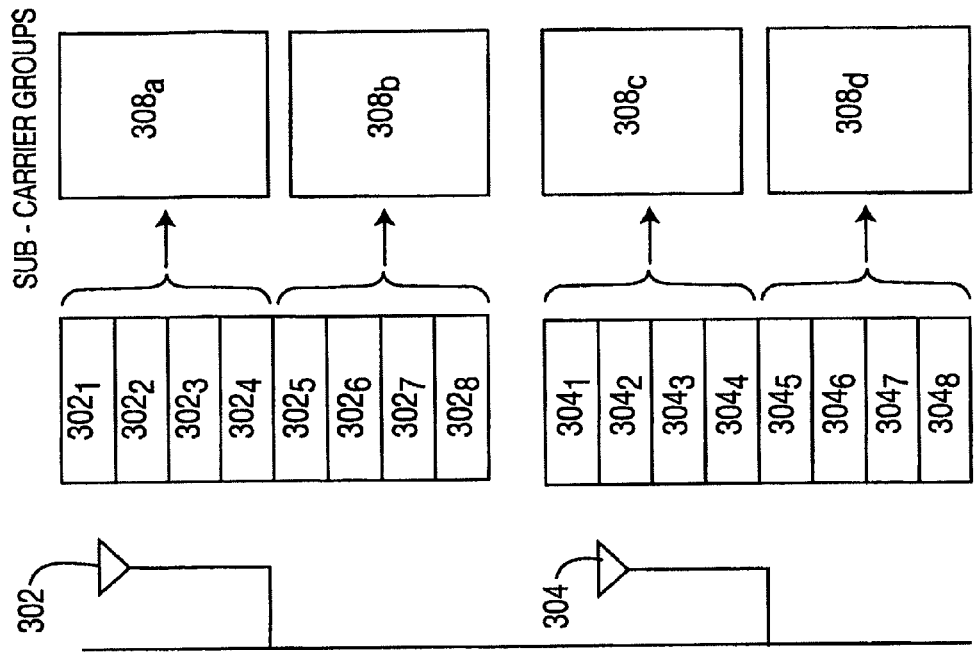
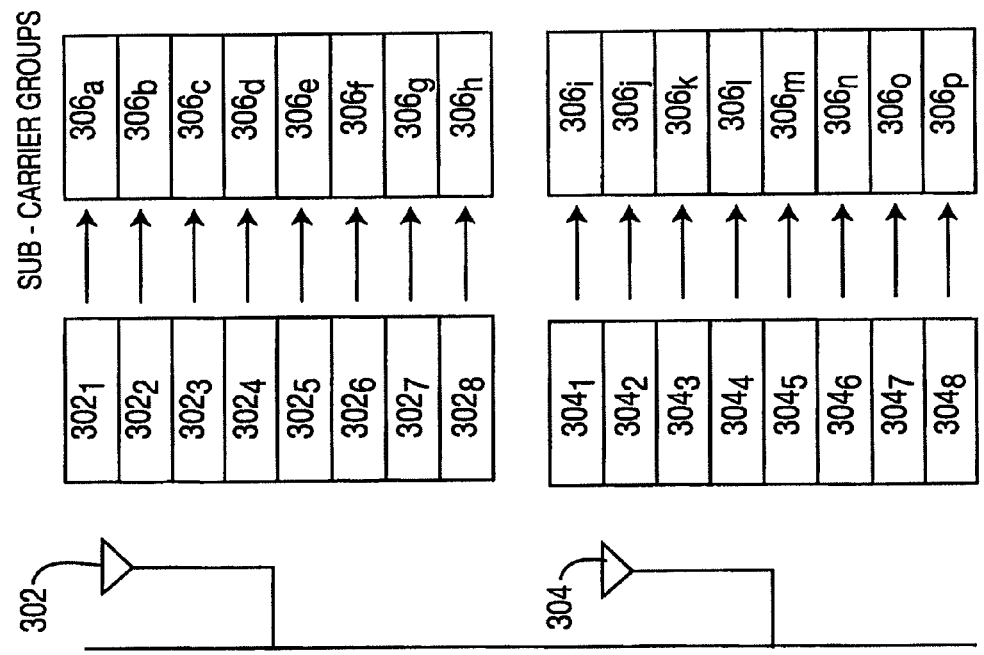

QUALITY CONTROL SCHEME FOR MULTIPLE-INPUT MULTIPLE-OUTPUT (MIMO) ORTHOGONAL FREQUENCY DIVISION MULTIPLEXING (OFDM) SYSTEMS

CROSS REFERENCE TO RELATED APPLICATION

This application is a continuation of application Ser. No. 11/118,867, filed on Apr. 29, 2005, which claims priority from Provisional Application No. 60/598,183, which was filed on Aug. 2, 2004 which is incorporated by reference as if fully set forth.

FIELD OF INVENTION

The present invention relates to wireless communications. More particularly, the present invention relates to a method and apparatus for optimizing the system capacity of an Orthogonal Frequency Division Multiplexing (OFDM) system that uses with Multiple-Input Multiple-Output (MIMO) antennas.

BACKGROUND

Orthogonal Frequency Division Multiplexing (OFDM) is an efficient data transmission scheme where the data is split into smaller streams and each stream is transmitted using a sub-carrier with a smaller bandwidth than the total available transmission bandwidth. The efficiency of OFDM results from selecting sub-carriers that are mathematically orthogonal to each other. This orthogonality prevents closely situated sub-carriers from interfering with each other while each is carrying a portion of the total user data.

For practical reasons, OFDM may be preferred over other transmission schemes such as Code Division Multiple Access (CDMA). When user data is split into streams carried by different sub-carriers, for example, the effective data rate on each sub-carrier is less than the total transmitted data rate. As a result, the symbol duration of data transmitted with an OFDM scheme is much larger than the symbol duration of data transmitted with other schemes. Larger symbol durations are preferable as they can tolerate larger delay spreads. For instance, data that is transmitted with large symbol duration is less affected by multi-path than data that is transmitted with shorter symbol duration. Accordingly, OFDM symbols can overcome delay spreads that are typical in wireless communications without the use of a complicated receiver for recovering from such multi-path delay.

Multiple-Input Multiple-Output (MIMO) refers to a type of wireless transmission and reception scheme wherein both a transmitter and a receiver employ more than one antenna. A MIMO system takes advantage of the spatial diversity or spatial multiplexing options created by the presence of multiple antennas. In addition, a MIMO system improves signal quality, such as for example signal-to-noise ratio (SNR), and increases data throughput.

Multi-path, once considered a considerable burden to wireless communications, can actually be utilized to improve the overall performance of a wireless communication system. Since each multi-path component carries information about a transmitted signal, if properly resolved and collected, these multi-path components reveal more information about the transmitted signal, thus improving the communication.

Orthogonal Frequency Division Multiplexing (OFDM) systems that are used with Multiple-Input Multiple-Output (MIMO) are used to properly process multi-path for improving the overall system performance. In fact, MIMO-OFDM systems are considered as the technology solution for the IEEE 802.11n standard. An example of a MIMO-OFDM system 100 is shown in FIG. 1. A transmitter 102 processes a data stream Tx in an OFDM Tx processing unit 102a. This OFDM processing includes sub-carrier allocation and OFDM modulation of each sub-carrier. The modulated sub-carriers are then mapped to multiple antennas $103_1 \ldots 103_m$ according to a MIMO algorithm in a MIMO Tx processing unit 102b. Once mapped, the sub-carriers are transmitted to receiver 104 over multiple antennas $103_1 \ldots 103_m$ simultaneously.

At receiver 104, the modulated sub-carriers are received on multiple antennas $105_1 \ldots 105_n$. A MIMO processing unit 104a prepares the sub-carriers for demodulation. The sub-carriers are then demodulated in OFDM Rx processing unit 104b, yielding the Rx data.

One of the challenges of the MIMO-OFDM system design of 802.11n, however, is system capacity. Presently, an efficient method for optimizing the system capacity of a MIMO-OFDM system does not exist, particularly when the system utilizes a large number of sub-carriers. The "water-pouring" solution, for example, is a technique for increasing system capacity by selectively performing power or bit allocation to each sub-carrier. This technique requires, however, that the transmitter be aware of channel state information. The transmitter estimates this channel state information using feedback from a receiver in the system. The signaling overhead of this feedback, however, is significant and can limit the increase in system performance, particularly in systems transmitting large amounts of data and/or utilizing a large number of sub-carriers.

Accordingly, it is desirable to have alternate schemes for optimizing the system capacity of an MIMO-OFDM.

SUMMARY

The present relates to a method and apparatus for optimizing the system capacity of an Orthogonal Frequency Division Multiplexing (OFDM) system that uses with Multiple-Input Multiple-Output (MIMO) antennas. In a receiver, a target quality of service (QoS) metric and reference data rate are set. The target QoS metric may be set to a predetermined value and/or may be adjusted dynamically with respect to packet error rate (PER) by a slow outer-loop control processor. The QoS of received signals are measured and compared to the target QoS. Depending on the comparison, the receiver generates a channel quality indicator (CQI) which is sent back to the transmitting transmitter. The CQI is a one or two bit indicator which indicates to the transmitter to disable, adjust or maintain data transmission rates of particular sub-carriers, groups of sub-carriers per transmit antenna, or groups of sub-carriers across all transmit antennas. At the transmitter, the transmitted data rate is turned-off, increased, decreased, or maintained. At the receiver, the target QoS metric and reference data rate are adjusted accordingly. This process is repeated for each data frame of each sub-carrier group.

BRIEF DESCRIPTION OF THE DRAWINGS

A more detailed understanding of the invention may be had from the following description, given by way of example and to be understood in conjunction with the accompanying drawings wherein:

FIGS. 3A, 3B, and 3C illustrate various sub-carrier groupings; and

DETAILED DESCRIPTION OF THE PREFERRED EMBODIMENTS

The present invention may be implemented in a WTRU or in a base station. The terminology "WTRU" includes but is not limited to user equipment, a mobile station, a fixed or mobile subscriber unit, a pager, or any other type of device capable of operating in a wireless environment. The terminology "base station" includes but is not limited to a Node-B, a site controller, an access point or any other type of interfacing device in a wireless environment.

Elements of the embodiments may be incorporated into an integrated circuit (IC), multiple ICs, a multitude of interconnecting components, or a combination of interconnecting components and IC(s).

In a preferred embodiment, the system capacity for Orthogonal Frequency Division Multiplexing (OFDM) systems that are used with Multiple-Input Multiple-Output (MIMO) antennas is optimized using quality measurements. These quality measurements may be taken continuously, periodically or preferably, over a sliding window of quality measurement observations. In a MIMO-OFDM receiver, an initial or target quality of service (QoS) metric and corresponding initial reference data rate are set. The QoS of received signals are measured and compared to the target QoS. Depending on the comparison, the receiver generates one of a plurality of channel quality indicators (CQI) which is sent back to the origin transmitter of the signals. The CQI is a one or two bit indicator which informs the transmitting transmitter to disable, adjust or maintain the data transmission rates, (i.e., the modulation order of Quadrature Amplitude Modulation (QAM) and channel code rate), of particular sub-carriers or groups of sub-carriers per transmit antenna. Once the CQI is sent back to the transmitter, the transmitted data rate is disabled, adjusted or maintained in accordance with the CQI, and at the receiver, the target QoS metric and the reference data rate are adjusted accordingly. This process is then repeated for each received signal on each sub-carrier group, gradually reaching optimal system capacity. This concept is further illustrated with reference to FIG. 2.

Figure 1:
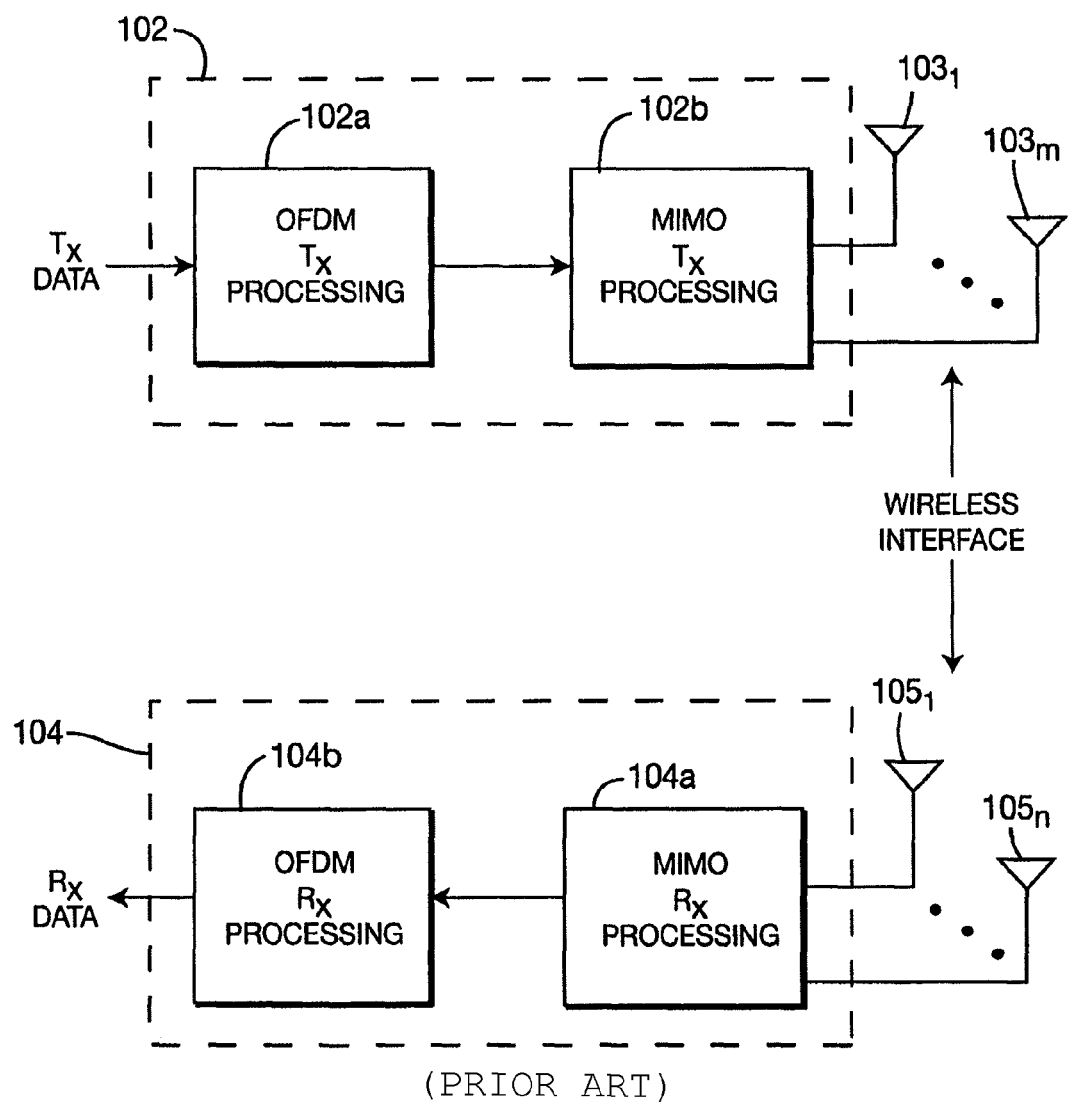
FIG. 1 illustrates a Multiple-In Multiple-Out (MIMO) Orthogonal Frequency Division Multiplexing (OFDM) system.
Figure 2:
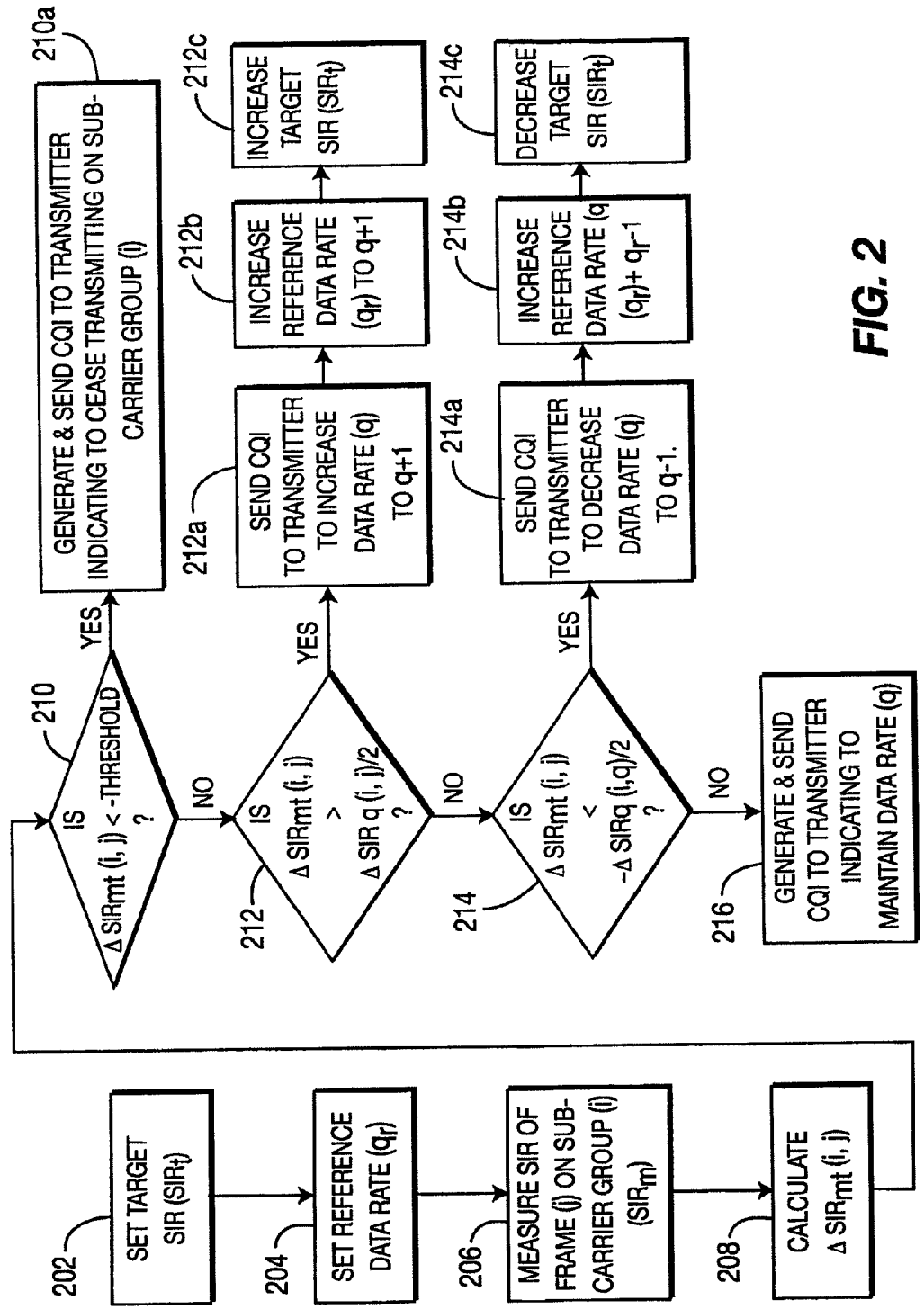
FIG. 2 is a flow diagram of a method for optimizing the system capacity of a MIMO-OFDM system.

FIG. 2 illustrates a flow diagram 200 representative of the system-optimizing algorithm of the present embodiment. For the purpose of this illustration, signal-to-interference-ratio (SIR) represents the QoS metric of a sample MIMO-OFDM system. It should be understood, however, that any QoS metric, such as for example, signal-to-noise ratio (SNR), bit error rate (BER), and the like, may be utilized in accordance with the present embodiment to accommodate the needs of a particular user.

Within receiver 201, an initial target SIR ($SIR_t$) is set (step 202). This target SIR is preferably obtained from a pre-defined storage within the receiver 201, such as for example, a look-up table. Alternatively, $SIR_t$ the may be obtained and adjusted dynamically with respect to packet error rate (PER) by a slow outer-loop control processor.

In conjunction with setting the $SIR_t$ (step 202), an initial reference data rate ($q_r$) is set (step 204) to a predetermined value. Although the present embodiment describes optimizing the data transmission rate of a MIMO-OFDM system, it should be understood that a MIMO-OFDM system may alternatively be optimized in terms of transmission power.

Figure 3C:
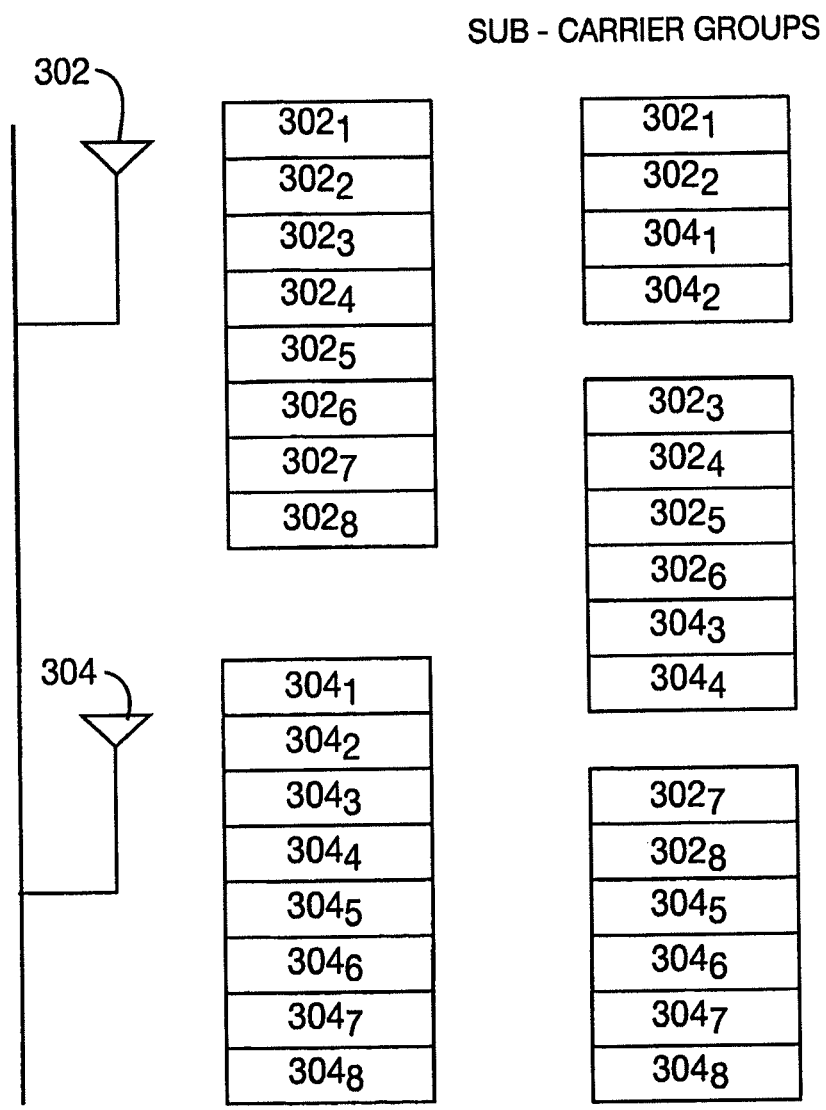

Once the $SIR_t$ and $q_r$ are set, (steps 202 and 204, respectively), the receiver 201 measures the SIR of the $j^{th}$ frame of a received $i^{th}$ sub-carrier group ($SIR_m$) (step 206). A sub-carrier group is pre-defined as a single sub-carrier, as a group of sub-carriers from a given transmit antenna, or as a group of sub-carriers from multiple transmit antennas. FIGS. 3A-3C illustrates these various sub-carrier groupings. Transmit antennas 302 and 304, for example, each transmit data over eight sub-carriers, $302_1, 302_2, \ldots 302_8$, and $304_1, 304_2, \ldots 304_8$, respectively. In FIG. 3A, each sub-carrier, $302_1$-$302_8$ and $304_1$-$304_8$ is pre-defined as a sub-carrier group $306a$-$306p$ comprising a single sub-carrier. In FIG. 3B, sub-carriers $302_1$-$302_8$ from antenna 302 are grouped into two sub-carrier groupings, $308a$ and $308b$. Similarly, sub-carriers $304_1$-$304_8$ from antenna 304 are grouped into two sub-carrier groupings, $308c$ and $308d$. FIG. 3C illustrates sub-carrier groupings $310a$-$310c$ each comprising sub-carriers from both antennas 302 and 304.

The measured SIR ($SIR_m$) (step 206) of the $i^{th}$ sub-carrier group is then compared to the $SIR_t$ to calculate their difference according to Formula 1 below:

$$\Delta SIR_{mt(i,j)} = SIR_{m(i,j)} - SIR_{t(i,j)}, \quad \text{Formula (1)}$$

where i is the respective sub-carrier group number and j is the respective frame number (step 208). The calculated difference between the $SIR_m$ and the $SIR_t$ ($\Delta SIR_{mt(i,j)}$) is then compared to a threshold value (step 210). The threshold value is a pre-defined value stored in the receiver 201 which represents an acceptable negative variance from the target SIR. If $\Delta SIR_{mt(i,j)}$ yields a negative variance that is greater than that allowed by the threshold, i.e., $\Delta SIR_{mt(i,j)}$ is less than (−)threshold value, a 2-bit CQI, such as for example "00", is generated and sent to the transmitting transmitter (not shown) (step 210a). This "00" CQI indicates to the transmitter (not shown) to cease transmitting on the current, $i^{th}$ sub-carrier group.

Otherwise, if $\Delta SIR_{mt(i,j)}$ is not beyond the pre-defined threshold level, $\Delta SIR_{mt(i,j)}$ is compared to the difference between a SIR value associated with the transmitted data rate (q) and a SIR value associated with the next highest data rate (q30 1) ($\Delta SIRq_{(i,q)}$) (step 212) in order to determine whether $\Delta SIR_{mt(i,j)}$ is large enough to increase the current data rate. To make this determination, receiver 201 utilizes a look-up table which represents Data Rate (q) vs. $\Delta SIRq$. This look-up table is produced from a series of measurements or from simulation(s) and is stored in the receiver 201. In this table, $\Delta SIRq$ represents the difference in SIR between a transmitted data rate q and the next highest data rate q+1 in the look-up table. Thus, if $\Delta SIR_{mt(i,j)}$ is larger than one-half of $\Delta SIRq_{(i,q)}$ for a given frame (j) in a given sub-carrier group (i), (i.e., $\Delta SIR_{mt(j,i)} > \Delta SIRq_{(i,q)}/2$), $\Delta SIR_{mt(i,j)}$ is large enough to increase the data rate (q) to the next highest data rate (q+1) in the Data Rate look-up table.

Accordingly, a 2-bit CQI, such as for example "10", is generated and sent to the transmitting transmitter (not shown) (step 212a). This "10" CQI indicates to the transmitter (not shown) to increase the current data rate (q) to the next highest data rate (q+1) in the Data Rate vs. $\Delta SIRq$ look-up table (step 212b) and to adjust the target $SIR_{(i,j)}$ (step 212c) in accordance with Formula 2 below:

$$SIR_{t(i,j)} = SIR_{t(i,j-1)} + \Delta SIRq_{(i,q)}/2, \quad \text{Formula (2)}$$

where $SIR_{t(i,j-1)}$ represents the previous target SIR. Alternatively, the $SIR_{t(i,j)}$ can be adjusted (step 212c) in accordance with Formula 3 below:

$$SIR_{t(i,j)}=SIR_{t(i,j-1)}+[\Delta SIR_{mt(i,j)}-\Delta SIR_{mt(i,j-1)}].\qquad \text{Formula (3)}$$

If, however, it is determined that $\Delta SIR_{mt(i,j)}$ is not greater than $\Delta SIRq_{(i,q)}/2$ (step 212), $\Delta SIR_{mt(i,j)}$ is compared to $\Delta SIRq_{(i,q)}$ (step 214) in order to determine whether $\Delta SIR_{mt(i,j)}$ is small enough to decrease the data rate (q) to the next lowest data rate (q−1) in the look-up table. To make this determination, receiver 201 utilizes the same Data Rate vs. $\Delta SIRq$ look-up table described above with regards to step 212. In this comparison, however, if $\Delta SIR_{mt(i,j)}$ is less than one-half of the negative of $\Delta SIRq_{(i,q)}$, (i.e., $\Delta SIR_{mt(i,j)} < -(\Delta SIRq_{(i,q)}/2)$), a 2-bit CQI, such as for example "01", is generated and sent to the transmitting transmitter (not shown) (step 214a). This "01" CQI indicates to the transmitter (not shown) to decrease the data rate (q) to the next lowest data rate (q−1) in the Data Rate vs. $\Delta SIRq$ look-up table (step 214b) and to adjust the $SIR_{t(i,j)}$ (step 214c) in accordance with Formula 4 below:

$$SIR_{t(i,j)}=SIR_{t(i,j-1)}-\Delta SIRq_{(i,q)}/2,\qquad \text{Formula (4)}$$

where $SIR_{t(i,j-1)}$ represents the target SIR of the previous data frame. Alternatively, the target $SIR_{t(i,j)}$ can be adjusted (step 214c) in accordance with Formula 5 below:

$$SIR_{t(i,j)}=SIR_{t(i,j-1)}-[\Delta SIR_{mt(i,j)}-\Delta SIR_{mt(i,j-1)}].\qquad \text{Formula (5)}$$

It should be understood that the difference between successive data rates, (i.e., step size), in the data rate table of steps 212 and 214 does not necessarily have to be uniform. In fact, it may be varied according to a user's needs. For example, the step size in the data rate table may be four (4) for the first x-number of frames (in transient state), while the step size for all frames after the xth frame can be one (1) (steady state).

After comparing the difference between the $SIR_m$ and the $SIR_t$ for a given frame (j) in a given sub-carrier group (i) ($\Delta SIR_{mt(i,j)}$) to the threshold value in step 210 and to $\Delta SIRq_{(i,q)}$ in steps 212-214, it is determined if $\Delta SIR_{mt(i,j)}$ is within the threshold value (step 210) and neither large enough to increase the current data rate (step 212) nor small enough to decrease the current data rate (step 214). If $\Delta SIR_{mt(i,j)}$ meets that criteria, a 2-bit CQI, such as for example "11", is generated and sent to the transmitting transmitter (not shown) (step 216). This "11" CQI indicates to the transmitter (not shown) to continue transmitting at the current data rate.

It should be noted that steps 206 through 216 of this process 200 comprise a looping algorithm which is repeated for all sub-carrier groups (i) and for all frames (j). In addition, the target $SIR_{t(i,j)}$ and reference data rate $_{(i,j)}$ of a given sub-carrier group (i) and frame (j) act as the reference $SIR_t$ and reference data rate $(q_r)$, respectively, for the next frame (j+1) in the $i^{th}$ sub-carrier group. It is this continual updating of the transmitted data rate that causes the MIMO-OFDM system to gradually reach its optimal performance level.

Figure 4:
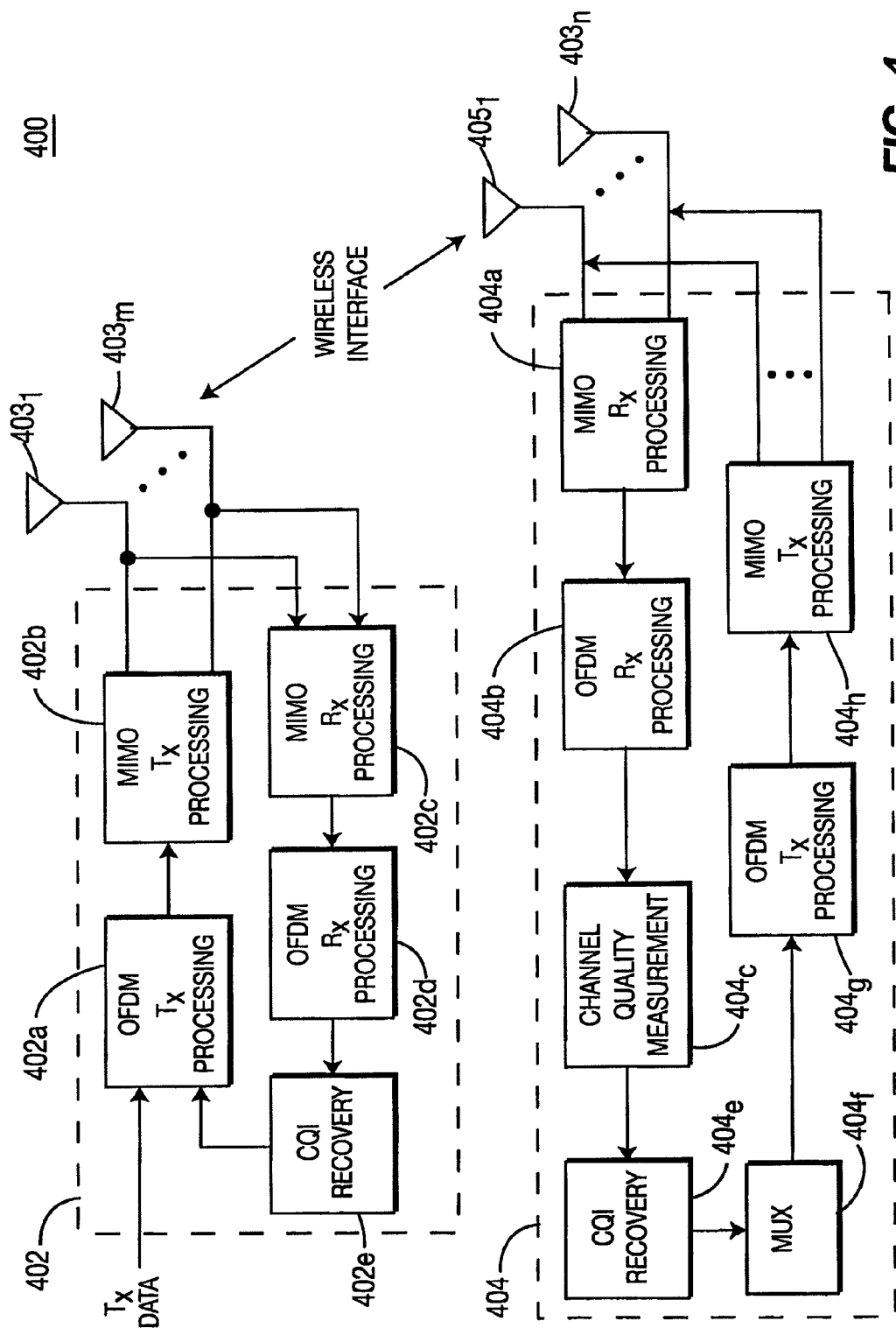
FIG. 4 illustrates a MIMO-OFDM system with means for optimizing its system capacity utilizing quality measurement bits.

A MIMO-OFDM system 400 with means for optimizing its system capacity utilizing quality measurement bits in a manner described herein is shown in FIG. 4. A transmitter 402 processes a data stream Tx in an OFDM processing unit 402a. This OFDM processing includes sub-carrier allocation and OFDM modulation of each sub-carrier. The modulated sub-carriers are then mapped to multiple antennas $403_1 \ldots 403_m$ according to a MIMO algorithm in a MIMO Tx processing unit 402b. Once mapped, the sub-carriers are transmitted to receiver 404 over multiple antennas $403_1 \ldots 403_m$ simultaneously.

At the receiver 404, the modulated sub-carriers are received on multiple antennas $405_1 \ldots 405_n$. The received sub-carriers are sent to a MIMO Rx processing unit 404a where an inverse MIMO algorithm prepares the sub-carriers for demodulation. The MIMO decoded sub-carriers are then sent to OFDM Rx unit 404b where they are demodulated. Next, the demodulated data is sent to a Channel Quality Measurement unit 404c, frame by frame, wherein a quality measurement is taken for each data frame. Each of these quality measurements are then sequentially compared to a target quality metric in a Channel Quality Comparison unit 404d. Depending on the comparison, a Channel Quality Indicator (CQI) Signaling unit 404e generates a one or two bit CQI for each measured data frame and sends the CQIs to a MUX unit 404f for processing. These CQIs are then modulated in an OFDM Tx unit 404g, and mapped to multiple antennas $405_1 \ldots 405_n$, via MIMO Tx unit 404h for transmission to transmitter 402.

At the transmitter 402, the encoded CQIs are received on multiple antennas $403_1 \ldots 403_m$, prepared for demodulated in MIMO Rx unit 402c, and demodulated in OFDM Rx unit 402d. Once demodulated, the extracted data is sent to a CQI recovery unit 402e where the one or two bit CQI is extracted and processed. The OFDM processing unit 402a then allocates and modulates the sub-carriers with the next Tx data stream according to the processed CQI information. This entire process is then repeated so as to iteratively increase (or decrease) the data transmission rate of a given sub-carrier thereby maximizing the system's capacity.

In an alternate embodiment, the CQI can be sent as a 1-bit indicator, where one state of the binary bit would indicate to the transmitter to increase the data rate to a higher level and the other state of the binary bit is sent to indicate to the transmitter to decrease the transmitted data rate.

Although the features and elements of the present invention are described in the preferred embodiments in particular combinations, each feature or element can be used alone without the other features and elements of the preferred embodiments or in various combinations with or without other features and elements of the present invention. Further, the features and elements of the present invention may be implemented on a single IC, such as an application specific integrated circuit (ASIC), multiple ICs, discrete components, or a combination of discrete components and ICs. Moreover, the present invention may be implemented in any type of wireless communication system. In some deployments, the IC(s)/discrete components may have some of these features and elements, which are totally or partially disabled or deactivated.

While the present invention has been described in terms of the preferred embodiment, other variations which are within the scope of the invention as outlined in the claims below will be apparent to those skilled in the art.

What is claimed is:

1. A wireless transmit/receive unit (WTRU) comprising:
   at least one processor configured to receive an orthogonal division multiple access (OFDM) signal;
   wherein the OFDM signal includes a plurality of subcarriers; wherein the at least one processor is configured to perform a quality measurement for each of a plurality of groups of the subcarriers; wherein the at least one processor is configured to determine a first value associated with a channel quality indicator (CQI) table;
   wherein the first value indicates a data rate; wherein differences between data rates in the CQI table are not uniform;
   wherein the at least one processor is configured to determine for each of the plurality of groups, an n-bit indication of an amount of difference in the channel quality indicator (CQI) table between the first value and a value associated with that group in response to the quality measurement of that group;

wherein the at least one processor is further configured to transmit the n-bit indications.

2. The WTRU of claim 1 wherein the n-bit indications are 2-bit indications.

3. The WTRU of claim 1 wherein each of the n-bit indications is associated with all transmit antennas of a base station.

4. The WTRU of claim 1 wherein the at least one processor is configured to receive a MIMO OFDM signal;

wherein the MIMO OFDM signal includes a plurality of MIMO signals;

wherein each of the n-bit indications is associated with one of the plurality of MIMO signals and one of the groups of subcarriers.

5. The WTRU of claim 1 wherein the quality measurements are signal to interference ratios.

6. A method comprising:

receiving, by wireless transmit/receive unit (WTRU), an orthogonal division multiple access (OFDM) signal; wherein the OFDM signal includes a plurality of subcarriers;

performing a quality measurement for each of a plurality of groups of the subcarriers;

determining a first value associated with a channel quality indicator (CQI) table; wherein the first value indicates a data rate; wherein differences between data rates in the CQI table are not uniform;

determining for each of the plurality of groups, an n-bit indication of an amount of difference in the channel quality indicator (CQI) table between the first value and a value associated with that group in response to the quality measurement of that group;

wherein the at least one processor is further configured to transmit the n-bit indications.

7. The method of claim 6 wherein the n-bit indications are 2-bit indications.

8. The method of claim 6 wherein each of the n-bit indications is associated with all transmit antennas of a base station.

9. The method of claim 6 wherein the OFDM signal is a MIMO OFDM signal;

wherein the MIMO OFDM signal includes a plurality of MIMO signals;

wherein each of the n-bit indications is associated with one of the plurality of MIMO signals and one of the groups of subcarriers.

10. The method of claim 6 wherein the quality measurements are signal to interference ratios.

* * * * *